United States Patent [19]
Beck, Jr.

[11] 4,050,200
[45] Sept. 27, 1977

[54] REMOVABLE HATCH STRUCTURE FOR AUTOMOBILES

[75] Inventor: Edward G. Beck, Jr., Fort Thomas, Ky.

[73] Assignee: The Stolle Corporation, Sidney, Ohio

[21] Appl. No.: 754,102

[22] Filed: Dec. 27, 1976

[51] Int. Cl.² ............................ E04B 7/18; E04C 2/00
[52] U.S. Cl. .......................................... 52/19; 52/627; 296/137 R; 296/146
[58] Field of Search ...................... 52/19, 20, 200, 201, 52/204, 213, 455, 474, 476, 578, 627, 628, 716; 49/490, 489, 494, 463, 351; 296/137 R, 146

[56] References Cited
U.S. PATENT DOCUMENTS

| | | | |
|---|---|---|---|
| 2,157,366 | 5/1939 | Vigroux | 296/146 |
| 2,190,263 | 2/1940 | Gerland | 52/627 |
| 2,408,483 | 10/1946 | Rodman | 52/628 X |
| 2,787,346 | 4/1957 | Goeckel | 52/627 |
| 2,939,186 | 6/1960 | Norwood et al. | 52/627 |
| 3,061,363 | 10/1962 | Martinez | 49/351 |
| 3,328,927 | 7/1967 | Kates | 52/627 X |
| 3,687,496 | 8/1972 | Hindin | 52/627 |

FOREIGN PATENT DOCUMENTS

| | | | |
|---|---|---|---|
| 185,106 | 3/1956 | Austria | 52/627 |

Primary Examiner—J. Karl Bell
Attorney, Agent, or Firm—Melville, Strasser, Foster & Hoffman

[57] ABSTRACT

There is disclosed an assembly comprising a piece of rigid sheet material and a rigid linear member of metal, plastic, wood or other material, secured to an edge of the sheet material. The linear member and sheet are held in positive and immovable engagement and at the same time the joint is completely sealed to prevent the passage of liquids or gases therethrough. The mechanical means employed to lock the linear and sheet members together positively is so arranged that its presence is evident only on one side of the linear member. The assembly is so constructed that it can be taken apart readily without destroying either the sheet or the linear member. It is specifically disclosed in connection with a removable hatch for automobile roofs.

4 Claims, 3 Drawing Figures

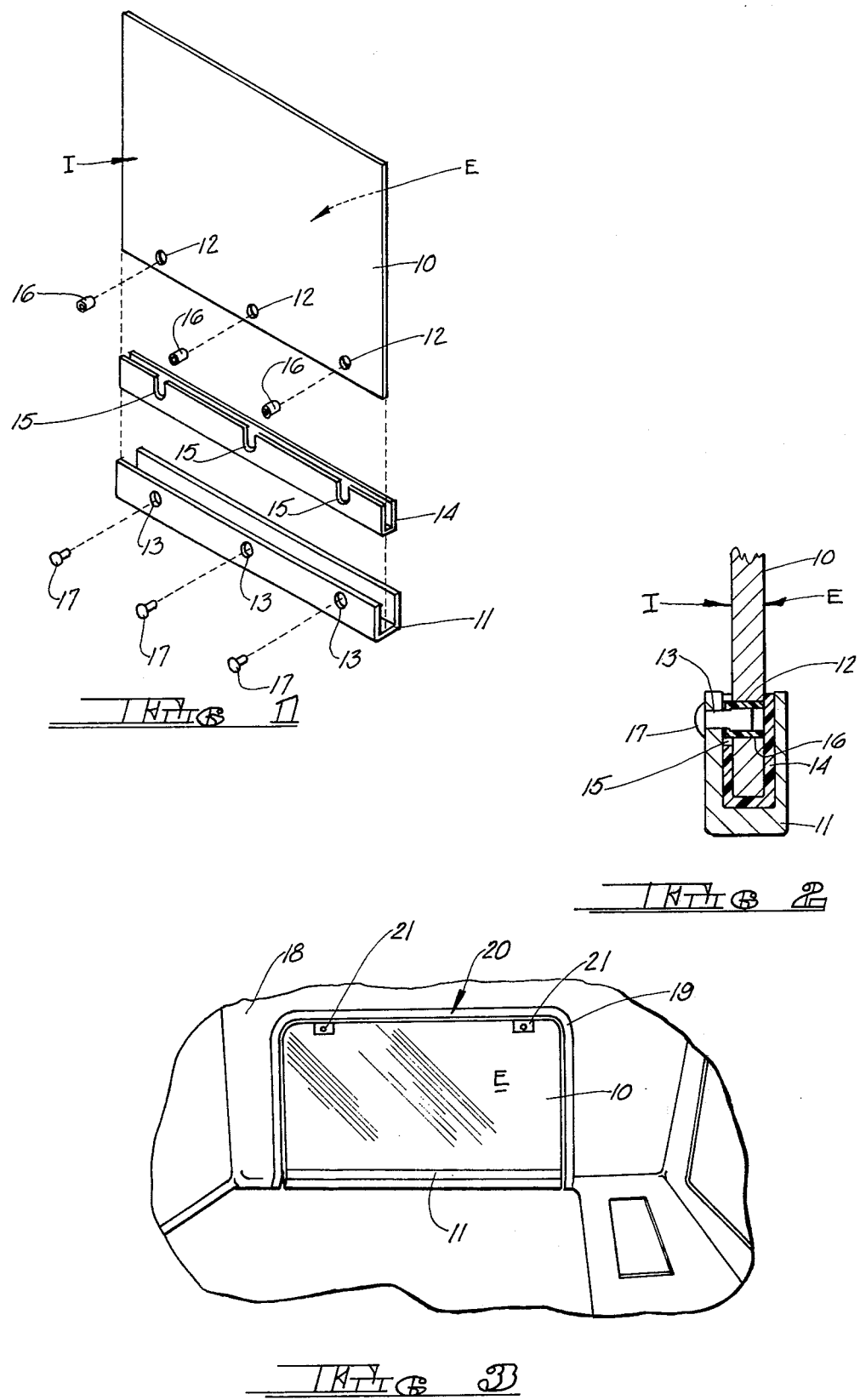

4,050,200

REMOVABLE HATCH STRUCTURE FOR AUTOMOBILES

BRIEF SUMMARY OF THE INVENTION

There are many constructions where it is desirable to secure a sheet of material, as for example a sheet of glass, to a rigid linear member in such a manner that the two are securely locked together and so that the locking means are not visible from one side of the assembly, while at the same time the assembly is water and gas-proof. In other words, the joint is completely sealed. If the sheet material is glass, it will of course be necessary to be able to remove the sheet and replace it in the event that the glass is broken, and the structure herein disclosed is such that it may be taken apart readily for replacement of the sheet in the linear member.

While the structure is useful in many situations as above noted, it is particularly disclosed herein in connection with a roof hatch for automobiles which is completely removable. In such hatches, it is desirable that the joint between the linear member and the glass will be held sealed tightly and locked in position without the locking means being visible from the outside of the automobile.

According to the present invention, the linear member is constituted of an extruded channel of suitable material such as aluminum, and it is provided on one side with a plurality of holes. The sheet of material to be assembled to the channel is provided with an equal number of holes spaced to line up with the holes in the channel. A gasket member of suitable material, such as a cellular neoprene, is secured to the glass panel by means of a suitable adhesive, (to hold it in position while the assembly to the channel is being made) and a plastic grommet is inserted in each of the holes in the glass. The gasket will of course be cut away in alignment with the holes in the channel and the glass.

The gasket having been adhesively secured to the edge of the glass which is to be secured to the channel, and the plastic grommets having been inserted in the holes of the glass, the assembly of gasket and glass and grommets is pushed into the channel, with the holes in the glass and gasket aligned with the holes in the channel. A pop rivet is then inserted through the holes in the channel on the one side and, when the rivet is popped, it expands against the grommet so that there is no metal-to-glass contact and yet the glass is securely locked in place in the channel. The cellular neoprene gasket prevents any leakage of gas or moisture through the joint.

BRIEF DESCRIPTION OF THE FIGURES OF THE DRAWING

In the drawings,

FIG. 1 is an exploded view of the components of the assembly.

FIG. 2 is a fragmentary cross sectional view through the joint, and

FIG. 3 is a fragmentary top plan view of an automobile roof showing a hatch in place.

DETAILED DESCRIPTION

The particular embodiment described is a hatch for an automobile roof which hatch can be entirely removed when it is desired to allow sunshine and air to enter the automobile. A sheet of glass 10, which is preferably about a quarter inch thick, is secured to one edge of an aluminum extrusion 11 which is in the form of a channel. The channel is deep enough to insure that, when the assembly is completed, the top edges of the channel legs are well above the edges of the holes in the glass, and has an inside width about 0.090 inch greater than the thickness of the glass. The sheet of glass 10 has a series of holes 12 positioned in a row parallel to one edge of the sheet, and the holes are approximately one-quarter inch in diameter and spaced about a half inch from the edge of the glass. The extrusion 11 has holes 13 through one leg of the channel and these holes are spaced to coincide with the holes 12 in the glass. The difference in width between the thickness of the glass and the space between the legs of the channels, which is approximately 0.045 inch on each side of the glass, is filled with a rubber-like gasket material in sheet form. This gasket material is cellular in structure and of such thickness that when it is in position, it is to some degree compressed. The gasket is indicated at 14 and it will have notches 15 to coincide with the position of the holes 12 and 13.

In assembling the structure, the sheet material of the gasket 14 is adhesively secured to both sides and one edge of the glass over the areas which will be in contact with the inside surfaces of the channel in the extrusion 11. It will be understood that the notches 15 must line up with the holes 12. The plastic grommets are indicated at 16 and they are inserted in the holes 12 in the glass 10. A flexible sealant in sufficient volume to fill the space not occupied by the expanded rivet shank is placed inside the grommets as extra insurance against any possible leakage through these holes (should the gasket accidentally be pulled down to the edge of the hole in the course of assembly).

The glass 10 with the gasket 14 and grommets 16 in place, is then pressed into engagement with the extrusion 11 so that the holes in the glass line up with the holes in the extrusion. 17 indicates expandable shank rivets, generally referred to as pop rivets, having a length such that, when in place, they do not quite touch the far side of the channel; these are inserted through the holes 13, notches 15 and through the grommets 16. The pop rivets are then expanded, thereby securely locking them to the extrusion, and thereby also locking the glass in secure assembly in the extrusion. The grommets referred to at 16 are necessary in a glass-to-metal assembly so that there will be no glass-to-metal contact. The grommets 16 have an outside diameter approximately equal to the diameter of the holes in the glass (say one-quarter inch) and an inside diameter as large as practical (say 3.16 inch) and a length equal to the thickness of the glass. Thus, the pop rivets when expanded press against the plastic grommet rather than against the glass.

In FIG. 3 there is shown a fragmentary portion of the roof 18 of an automobile showing the hatch indicated generally at 20 in place. The manner of securing the hatch in the roof of a car is well known and will not be described herein. A hole is simply cut in the roof of the car and the frame 19 is secured in the hole. A gasket in the frame 19 extends around the boundaries of the hole so that the glass is pressed against the gasket by the means which clamp the hatch in position. The side of the hatch in FIG. 3 which is exposed to view is the side indicated at E in FIGS. 1 and 2, while the inside surface is indicated at I. It will be noted that no fastenings are visible on the side E of the structure.

If it is necessary to take the assembly apart this can be very simply accomplished by merely drilling out the rivets 17 from the side I whereupon the glass, gasket and grommet assembly can be withdrawn from the extrusion.

In FIG. 3 locking tabs for the hatch are indicated at 21 which cooperate with grooves (not shown) in the member 19. The member 19 also is provided with a flexible rubber gasket (not shown) which seals the I side of the glass for a short distance in from the edge. The flexible gasket is also provided to seal the I side of the extrusion 11 against the roof opening. When the glass and extrusion assembly is put in place in the roof and locked down by conventional means (not shown) the gasket is compressed in the roof opening around all four sides, thus effectively sealing the opening against rain and wind. The locking devices are installed on the I side of the extrusion 11 and they bear against the underside of the roof beyond the cutout opening.

Thus, there has been provided a joint between glass and metal which is mechanically strong, completely sealed against the passage of air and water and aesthetically sound in that no fastening devices are evident on the exposed side E of the device. Furthermore, the assembly is such that if the glass is broken, it can be replaced readily.

It will be understood that while it has been described specifically in connection with a metal-to-glass assembly for use as a removable hatch in an automobile roof, it will be adaptable to many uses, and therefore no limitation is intended other than those set forth in the claims which follow.

The embodiments of the invention in which an exclusive property or privilege is claimed are defined as follows:

1. An assembly of a rigid sheet and rigid linear member, said linear member being in the form of a channel having a plurality of holes through one leg only thereof, said rigid sheet having a like number of holes aligned with the holes in said channel, a gasket member of compressible material in said channel extending between said channel walls and both sides and the edge of said sheet seated in said channel, and having openings aligned with said holes, and expandable shank rivets extending into said aligned holes and lockingly securing said sheet in said channel.

2. The structure of claim 1, wherein said rigid sheet is glass, and said channel is a metal extrusion, and a plastic grommet is seated in each of said holes in the glass, and said rivets contact said plastic grommet, whereby glass-to-metal contact is entirely avoided.

3. The structure of claim 1, wherein the aligned holes in said rigid sheet are filled with a sealant in sufficient volume to fill the space not occupied by the expanded rivet shank.

4. A removable hatch for an automobile roof having an opening in said roof, said opening being surrounded by a gasketed metal frame and being provided with securing means for said hatch; said hatch comprising a sheet of glass of a size to cover said opening, said sheet of glass being secured to a metal extrusion in the form of a channel, said channel having a plurality of holes through one leg only thereof and said rigid sheet of glass having a like number of holes aligned with the holes in said channel, a gasket member of compressible material in said channel extending between said channel walls on both sides and the edge of said sheet of glass seated in said channel, and having openings aligned with said holes, a plastic grommet in each of said holes in said sheet of glass, and expandable shank rivets extending into the said aligned holes and bearing against said grommets lockingly to secure said sheet in said channel.

* * * * *